United States Patent
Itskovich et al.

(10) Patent No.: US 10,564,310 B2
(45) Date of Patent: Feb. 18, 2020

(54) DIELECTRIC LOGGING WITH BROADBAND EXCITATION

(71) Applicant: Baker Hughes, a GE company, LLC, Houston, TX (US)

(72) Inventors: Gregory B. Itskovich, Houston, TX (US); Fei Le, Houston, TX (US); Rashid W. Khokhar, Sugar Land, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 133 days.

(21) Appl. No.: 15/906,853

(22) Filed: Feb. 27, 2018

(65) Prior Publication Data
US 2019/0265382 A1  Aug. 29, 2019

(51) Int. Cl.
G01V 3/38 (2006.01)
G01V 3/30 (2006.01)
(Continued)

(52) U.S. Cl.
CPC .......... *G01V 3/38* (2013.01); *E21B 49/00* (2013.01); *E21B 49/087* (2013.01); *G01V 3/20* (2013.01); *G01V 3/30* (2013.01); *E21B 7/04* (2013.01); *E21B 43/11* (2013.01); *E21B 43/26* (2013.01); *E21B 47/18* (2013.01); *E21B 2049/085* (2013.01)

(58) Field of Classification Search
CPC .......... G01V 3/30; G01V 3/20; E21B 49/00
See application file for complete search history.

(56) References Cited

U.S. PATENT DOCUMENTS 3,891,916 A  6/1975  Arnold et al.
4,009,434 A  2/1977  McKinlay et al.
(Continued)

FOREIGN PATENT DOCUMENTS

DE  2832433 A1  2/1980
WO  2005117450 A2  12/2005

OTHER PUBLICATIONS

Notification of Transmittal of the International Search Report and the Written Opinion of the International Searching Authority, PCT/US2019/001961; dated May 21, 2019; 11 pages.
(Continued)

*Primary Examiner* — Alvaro E Fortich
(74) *Attorney, Agent, or Firm* — Cantor Colburn LLP (57) ABSTRACT

A method for performing a formation physical action includes: transmitting a first time-domain transient electromagnetic (EM) signal into a borehole and the formation using a downhole EM wave propagation tool, the first EM signal having frequency domain components in a range of at least 1 MHz to 1 GHz; receiving a second time-domain transient EM signal due to the transmitting of the first EM signal, the second EM signal having frequency domain components in the range of at least 1 MHz to 1 GHz; calculating attenuation and phase shift S-parameters as a function of frequency using the first and second EM signals; assigning to the formation at least one of a resistivity value and a permittivity value of a reference that matches or is within a selected range of the attenuation and phase shift S-parameters; and performing the physical action using the at least one of the resistivity value and the permittivity value.

19 Claims, 7 Drawing Sheets

(51) Int. Cl.
*G01V 3/20* (2006.01)
*E21B 49/00* (2006.01)
*E21B 49/08* (2006.01)
*E21B 47/18* (2012.01)
*E21B 7/04* (2006.01)
*E21B 43/26* (2006.01)
*E21B 43/11* (2006.01)

(56) References Cited

U.S. PATENT DOCUMENTS

| | | |
|---|---|---|
| 4,012,689 A | 3/1977 | Cox et al. |
| 4,107,597 A | 8/1978 | Meador et al. |
| 4,489,276 A | 12/1984 | Yu |
| 4,594,551 A | 6/1986 | Cox et al. |
| 4,687,995 A | 8/1987 | Warren et al. |
| 4,785,247 A | 11/1988 | Meador et al. |
| 5,132,623 A | 7/1992 | De et al. |
| 5,367,262 A * | 11/1994 | Manning ............... G01V 3/30 324/338 |
| 5,811,973 A | 9/1998 | Meyer, Jr. |
| 6,509,738 B1 | 1/2003 | Minerbo et al. |
| 6,777,940 B2 | 8/2004 | Macune |
| 8,680,865 B2 | 3/2014 | Zhang et al. |
| 8,957,683 B2 | 2/2015 | Bittar et al. |
| 9,356,342 B1 * | 5/2016 | Whetten ................ H01Q 1/50 |
| 2011/0068796 A1 | 3/2011 | Signorelli et al. |
| 2011/0251795 A1 | 10/2011 | Difoggio et al. |
| 2015/0008928 A1 | 1/2015 | Miles et al. |
| 2016/0094331 A1 * | 3/2016 | White ................ H04B 1/525 370/278 |
| 2016/0187521 A1 | 6/2016 | Homan et al. |
| 2016/0282512 A1 | 9/2016 | Donderici et al. |
| 2016/0363686 A1 | 12/2016 | Kouchmeshky et al. |
| 2017/0010377 A1 | 1/2017 | Terentev et al. |
| 2017/0102479 A1 | 4/2017 | Kouchmeshky et al. |

OTHER PUBLICATIONS

Schlumberger; "Dielectric Scanner"; 2017; Sclumberger Limited;[retrieved on Sep. 19, 2017]; Retrived from the internet; URL:http//www.slb.com/services/characterization/petrophysics/wireline/dielectric_scanner.aspx; 2 pages.

* cited by examiner

DIELECTRIC LOGGING WITH BROADBAND EXCITATION

BACKGROUND

Geologic formations may contain reservoirs of sought-after hydrocarbons. Boreholes are typically drilled into the reservoirs where the hydrocarbons can be extracted through rock fractures in the formations. Logging tools may be conveyed through the boreholes in order to characterize the formations so that drilling and/or completion resources can be used efficiently. Hence, innovations that improve the accuracy of formation characterization would be well received in the drilling and production industries.

SUMMARY

Disclosed is a method for performing a physical action related to a formation. The method includes: transmitting a first time-domain transient electromagnetic (EM) signal into a borehole penetrating the formation and into the formation using a downhole EM wave propagation tool configured to be conveyed through the borehole, the first time-domain transient EM signal having frequency domain components in a range of at least 1 MHz to 1 GHz; receiving a second time-domain transient EM signal from the borehole and the formation due to the transmitting of the first EM signal using the downhole EM wave propagation tool, the second time-domain transient EM signal having frequency domain components in the range of at least 1 MHz to 1 GHz; calculating, with a processor, an S-parameter attenuation as a function of frequency and an S-parameter phase shift as a function of frequency using the first time-domain transient EM signal and the second time-domain transient EM signal; identifying, with the processor, a reference having a reference S-parameter attenuation as a function of frequency and a reference S-parameter phase shift as a function of frequency that are within a selected range of the calculated S-parameter attenuation as a function of frequency and the calculated S-parameter phase shift as a function of frequency, the reference representing at least one of a reference EM wave propagation tool parameter, a borehole parameter, and a formation parameter, the formation parameter comprising at least one of a resistivity value and a permittivity value of the formation as a function of frequency; assigning, with the processor, the at least one of the resistivity value and the permittivity value of the reference to the formation as a function of logging depth; and performing the physical action related to the formation using the at least one of the assigned resistivity value and the assigned permittivity value as a function of logging depth.

Also disclosed is an apparatus for performing a physical action related to a formation. The apparatus includes: a downhole EM wave propagation tool configured to be conveyed through a borehole penetrating the formation and having a broadband transmitter assembly configured to transmit a first electromagnetic (EM) signal into the borehole and the formation, the first EM signal having frequency domain components in a range of at least 1 MHz to 1 GHz, the broadband transmitter assembly comprising a transmitter antenna; and a broadband receiver assembly included in the downhole EM wave propagation tool and configured to receive a second time-domain transient EM signal from the borehole and the formation due to the transmitting of the first time-domain transient EM signal using the downhole EM wave propagation tool, the second time-domain transient EM signal having frequency domain components in the range of at least 1 MHz to 1 GHz, the broadband receiver assembly having a receiver antenna. The apparatus also includes a processor configure to: calculate an S-parameter attenuation as a function of frequency and an S-parameter phase shift as a function of frequency using the first EM signal and the second EM signal; identify a reference comprising a reference S-parameter attenuation as a function of frequency and a reference S-parameter phase shift as a function of frequency that are within a specified range of the calculated S-parameter attenuation as a function of frequency and the calculated S-parameter phase shift as a function of frequency, the reference representing a reference EM wave propagation tool parameter, a borehole parameter, and a formation parameter, the formation parameter comprising at least one of a resistivity value and a permittivity value of the formation as a function of frequency; and assign the at least one of the resistivity value and the permittivity value of the reference to the formation as a function of logging depth. The apparatus further includes physical-action apparatus configured to perform the physical action related to the formation using the at least one of the associated resistivity value and the associated permittivity value as a function of logging depth.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed are methods and apparatuses for performing a physical action related to a formation. The methods and apparatuses involve conveying an Electromagnetic (EM) wave propagation tool through a borehole penetrating a formation. The EM wave propagation tool transmits first electromagnetic (EM) energy into the borehole and formation. The first EM energy or first signal has a shape that has sine wave components having frequencies in a range of from at least 1 MHz to 1 GHz. That is, the shape of first signal is made up of sine waves having frequencies in at least the 1 MHz to 1 GHz range. Second EM energy or second signal is received due to the transmitting of the first EM energy. The first and second signals are transformed into the frequency domain using a Fourier transform to provide an S-parameter amplitude spectrum and an S-parameter phase spectrum for each of the first and second signals. Attenuation and phase difference between the spectrums are then used to obtain the dielectric permittivity of the formation and/or a relative amount of oil or hydrocarbons with respect to water. In that the EM wave propagation tool acquires data over a plurality of depths, the dielectric permittivity of the formation and/or a relative amount of oil or hydrocarbons with respect to water is determined as a function of depth. The physical action is then performed based on the dielectric permittivity of the formation and/or a relative amount of oil or hydrocarbons with respect to water as a function of depth.

An advantage of using a broadband regime for interrogating the formation is to acquire a dense multi-frequency spectrum suitable for determining dispersive dielectric characteristics of the formation. In contrast, prior art dielectric tools use very few discreet frequencies (between one and five frequencies for example) resulting in a loss of useful information that could have made an inversion of measurements more robust (i.e., providing a repeatable converging solution). Many factors can affect how a system of pores and fluid disposed in the pores react to a particular EM frequency. Some factors include type of fluids, size of pores, distribution of sizes, and shapes of the pores. Hence, the dense multi-frequency spectrum can adequately accommodate the different types of factors in interrogating the formation to provide more accurate information regarding the dispersive dielectric characteristics of the formation.

Figure 1:
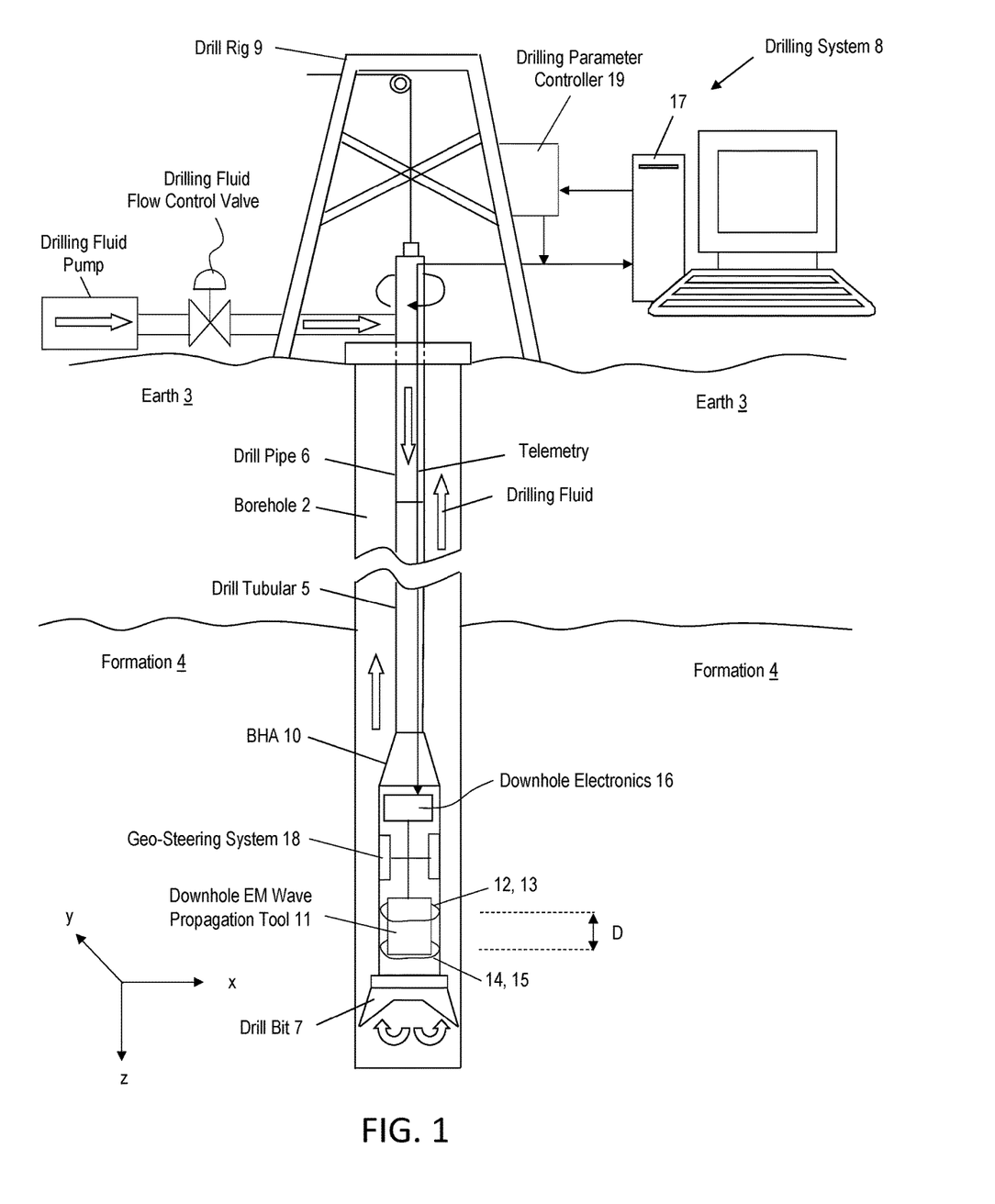
FIG. 1 illustrates a cross-sectional view of a drilling system having an induction tool disposed in a borehole penetrating the earth.

Apparatus for implementing the methods disclosed herein and performing a physical action related to a formation are now discussed. FIG. 1 illustrates drilling apparatus used for implementing the methods disclosed herein. FIG. 1 is a cross-sectional view of a borehole 2 (may also be referred to as a wellbore or well) penetrating the earth 3, which includes a formation 4. The formation 4 may include a reservoir of hydrocarbons such as oil or gas and other fluids such as water or brine.

A drilling system 8 includes a drill rig 9 that is configured to drill the borehole 2. A drill bit 7 is disposed at the distal end of a drill tubular 5 for drilling the borehole 2. The drill tubular 5 may be a drill string made up of a plurality of connected drill pipes 6. Drilling fluid or mud is pumped through the drill tubular 5 to lubricate the drill bit 7 and flush cuttings from the borehole 2. The drilling fluid is pumped by a drilling fluid pump and a flow rate of the drill fluid is controlled by a drilling fluid control valve. The drilling fluid pump and flow control valve may be controlled by a drilling parameter controller 19 to maintain a suitable pressure and flow rate to prevent the borehole 2 from collapsing. Suitable drilling fluid pressure and flow parameters may be determined by knowing the stresses of the formation rock, which can be determined from knowledge of fracture surrounding the wellbore 2. The drilling parameter controller 19 is configured to control, such as by feedback control for example, parameters used to drill the borehole.

The drill tubular 5 includes a bottomhole assembly (BHA) 10. The BHA 10 includes a downhole EM wave propagation tool 11 configured to sense resistivity or inversely conductivity of the formation 4 as a function of logging depth. The downhole EM wave propagation tool 11 includes a transmitter assembly 12 that includes a transmitter antenna 13 (e.g., a coil) and a receiver assembly 14 that includes a receiver antenna 15 (e.g., a coil) spaced a distance D from the transmitter antenna 13. The transmitter assembly 12 is configured to transmit first EM energy (or a first signal) into the borehole 2 and the formation 4. The first signal is a broadband time-domain transient signal having sine wave frequency components in a range of at least 1 MHz to 1 GHz). The receiver assembly 14 is configured to receive second EM energy (or a second signal) also in the broadband range of frequencies due to the transmitting of the first EM energy. Electronics for the transmitter assembly 12 and/or the receiver assembly 14 may be included in downhole electronics 16. Data acquired by the downhole EM wave propagation tool 11 may be transmitted to the surface by telemetry for processing such as by a computer processing system 17. This data may be processed downhole by the downhole electronics 16, at the surface by the computer processing system 16, or by some combination thereof. In that the downhole EM wave propagation tool 11 may be carried by the drill tubular 5, the drill tubular 5 may be referred to as a carrier.

The BHA 10 may also include a geo-steering system 18. The geo-steering system 18 is configured to steer the drill bit 7 in order to drill the borehole 2 according to a selected trajectory, path or geometry. The trajectory, path or geometry in general is selected to optimize hydrocarbon production from the borehole 2. In one or more embodiments, the trajectory is selected to place the wellbore in a formation volume having a maximum hydrocarbon availability or within a selected range of the maximum hydrocarbon availability. Steering commands may be transmitted from the drilling parameter controller 19 to the geo-steering system 18 by the telemetry. Telemetry in one or more embodiments may include mud-pulse telemetry or wired drill pipe. Downhole electronics 16 may act as an interface with the telemetry. Drilling system operation may be performed by the downhole electronics 18, the surface computer processing system 17, or some combination thereof.

Figure 2:
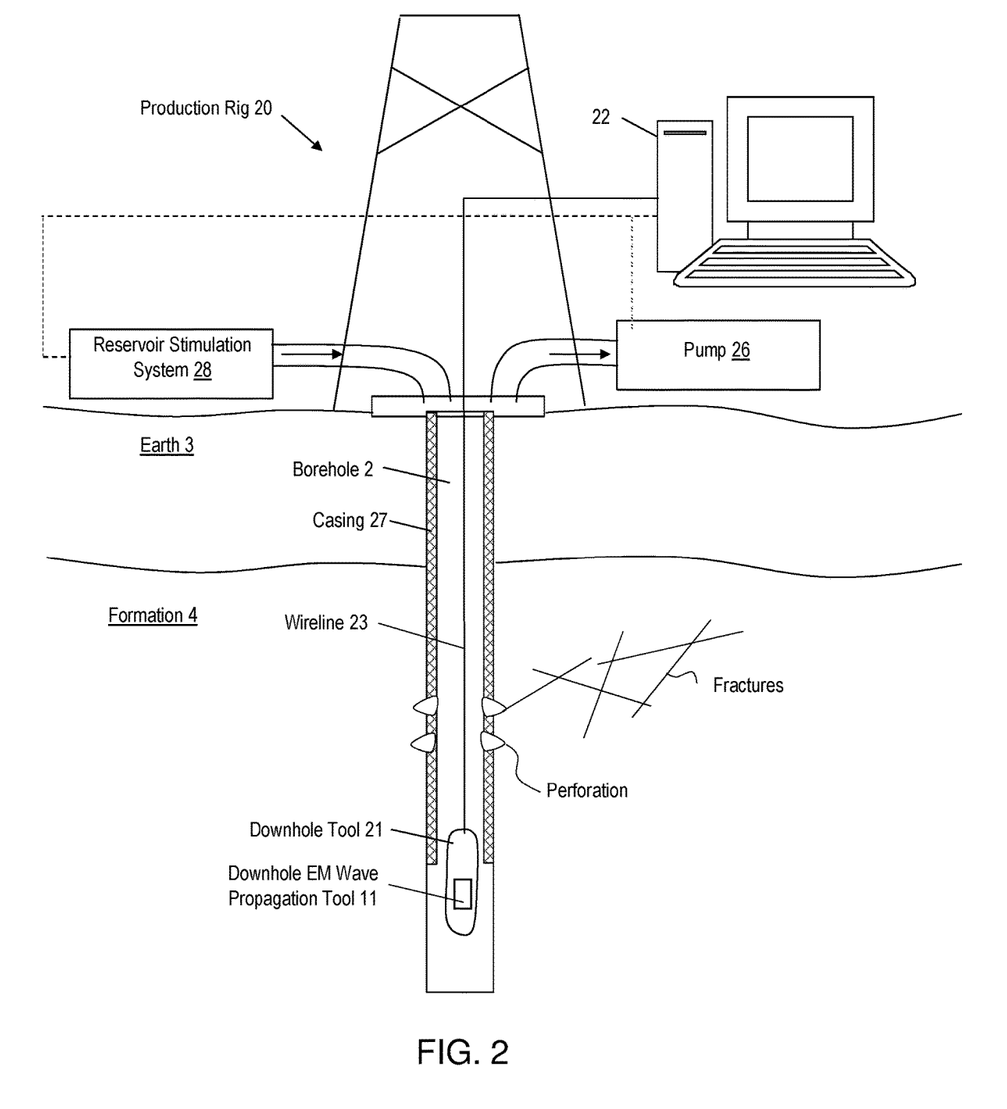
FIG. 2 illustrates a cross-sectional view of a production system using the borehole.

In that further actions are contemplated after the borehole 2 is drilled, production equipment for implementing those actions is now discussed. FIG. 2 depicts aspects of production equipment for producing hydrocarbons from the earth formation 4 in a cross-sectional view. A production rig 20 is configured to perform actions related to the production of hydrocarbons from a reservoir in the formation 4 via the borehole 2. For example, the production rig 20 may include a pump 26 configured to pump hydrocarbons entering the borehole 2 to the surface at a selected flow rate based on the amount of fluids in the formation 4 at a certain depth. The borehole 2 may be lined by a casing 27 to prevent the borehole 2 from collapsing. The production rig 20 may include a formation or reservoir stimulation system 28 configured to stimulate the earth formation 4 to increase the flow of hydrocarbons. In one or more embodiments, the reservoir stimulation system 28 is configured to hydraulically fracture rock in the formation 4. In one or more embodiments, the formation 4 is fractured in zones or depth intervals that have an amount of hydrocarbons (e.g., on a percentage basis relative to other fluids) that exceed a threshold value.

The production rig 20 may also be configured to convey a downhole tool 21 through the borehole 2. The downhole EM wave propagation tool 11 may be included in the downhole tool 21, which may be conveyed through the borehole 2 by a carrier such as an armored wireline 23 that also provides communications to the surface. In another embodiment, the downhole tool 21 maybe configured to perforate the casing 27 at selected locations based on a characteristic measured by the downhole EM wave propagation tool 11 to provide perforations that enable communication of formation fluids with the borehole 2 for extraction. In one or more embodiments, a depth or depth interval for perforation is selected based on an amount of hydrocarbons (e.g., on a percentage basis relative to other fluids) that exceed a threshold value.

FIG. 2 also illustrates a computer processing system 22. The computer processing system 22 is configured to implement the methods disclosed herein. Further, the computer processing system 22 may be configured to act as a controller for controlling operations of the production rig 20 to include well logging, downhole tool operation and/or formation stimulation operation.

Figure 3:
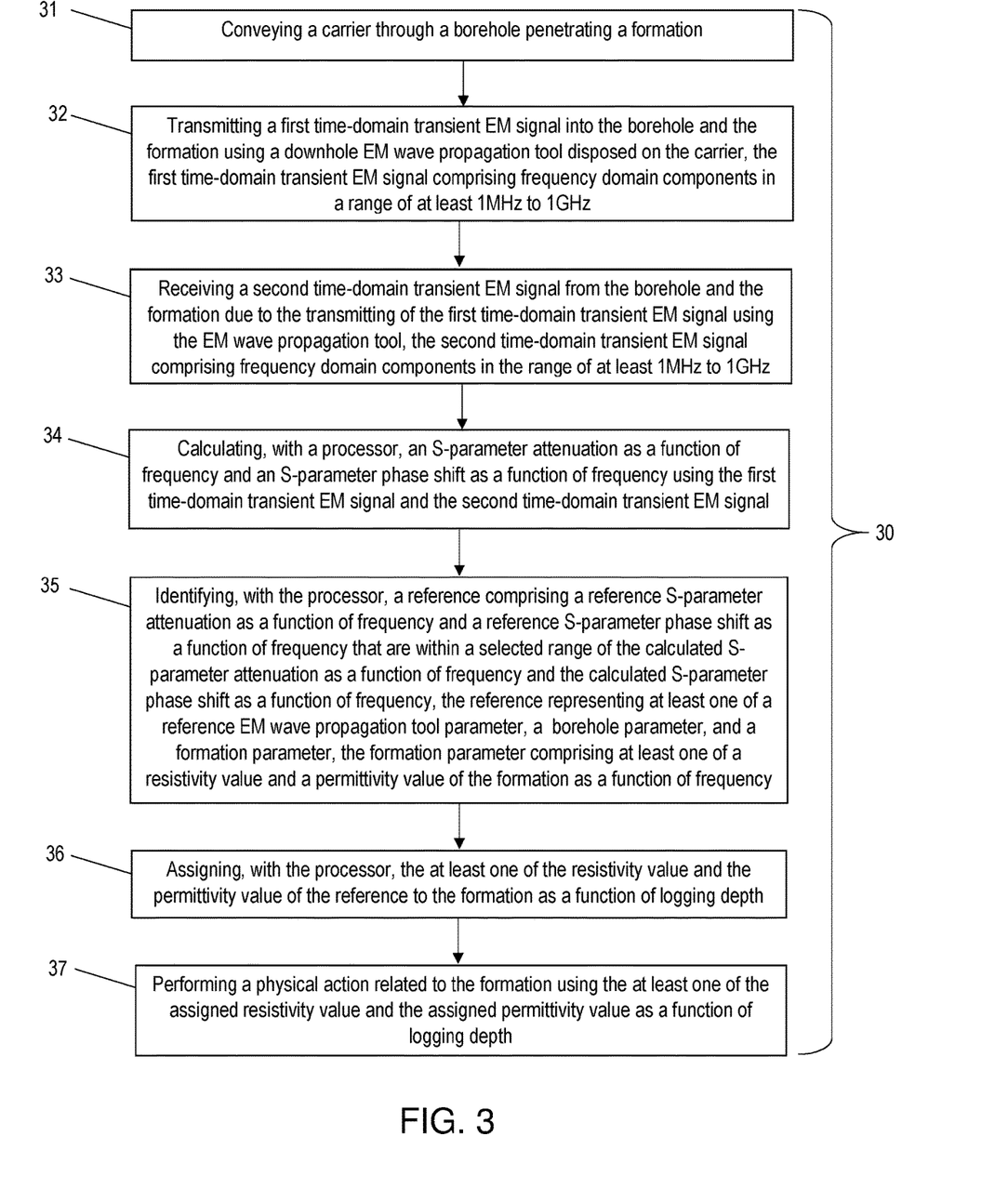
FIG. 3 depicts aspects of a shape of excitation voltage in a transmitter.
Figure 4:
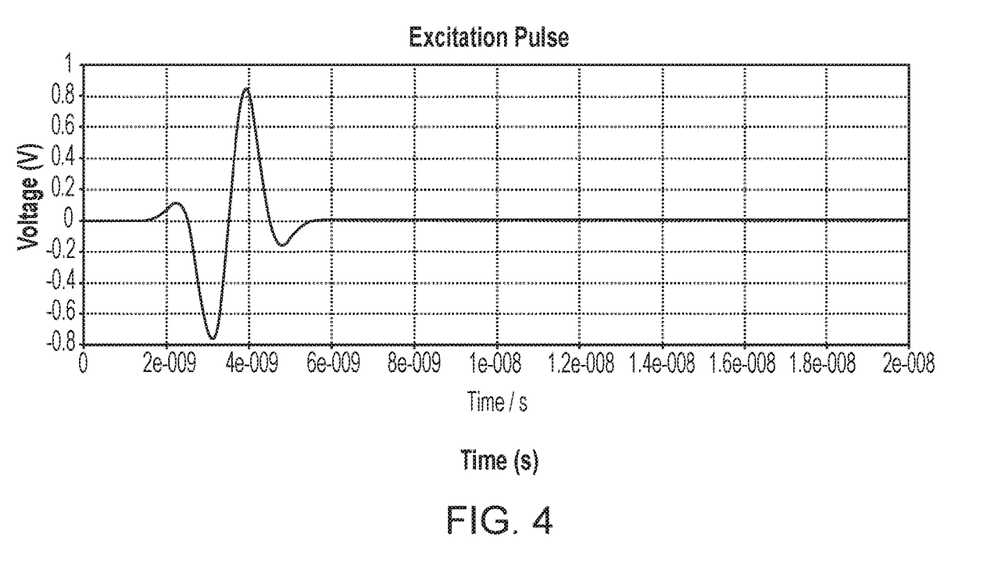
FIG. 4 depicts aspects of voltage of a received signal.
Figure 5:
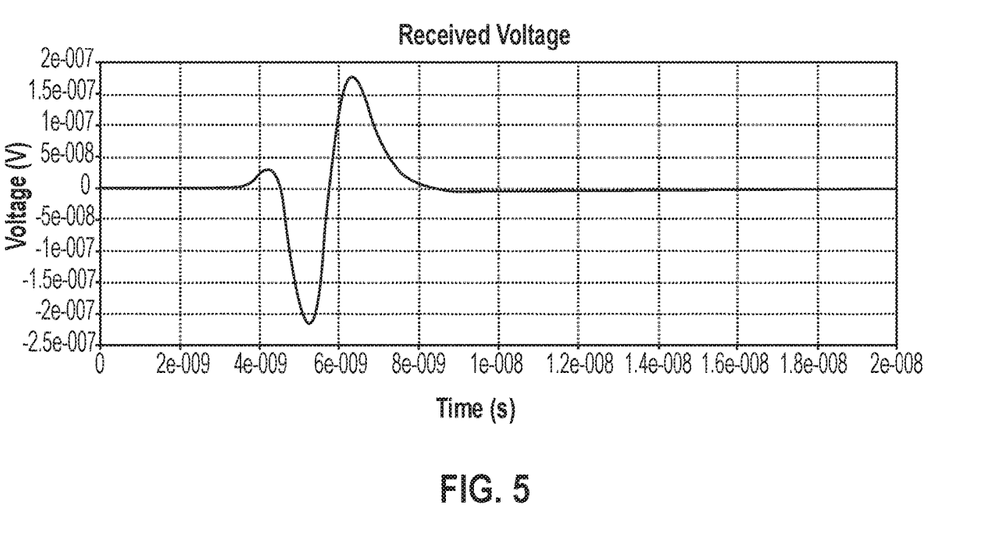
FIG. 5 depicts aspects of an S-parameter amplitude spectrum of the received signal.

FIG. 3 is a flow chart for a method 30 for performing a physical action related to a formation. Block 31 calls for conveying a carrier through a borehole penetrating the formation. In one or more embodiments, the carrier can be a drill string, coiled tubing, a slick line, or a wireline. Block 32 calls for transmitting a first time-domain transient EM signal into the borehole and the formation using a downhole EM wave propagation tool disposed on the carrier, the first time-domain transient EM signal comprising frequency domain components in a range of at least 1 MHz to 1 GHz. In one or more embodiments, the number of frequency domain components in that range is at least ten. In one or more embodiments, the number of frequency domain components is at least 100 or 1000 or more. In general, an increase in the number of frequency domain components will result in an increase in accuracy of values of properties determined using those frequency domain components. In one or more embodiments, the selected number of frequency domain components is spread evenly throughout the range of at least 1 MHz to 1 GHz. In one or more embodiments, the transmitting is performed by a transmitter assembly that is part of the downhole EM wave propagation tool. The transmitter assembly includes a transmitter antenna and associated transmitter electronics. FIG. 4 illustrates one example of a broadband shape of excitation voltage applied to the transmitter antenna. Block 33 calls for receiving a second time-domain transient EM signal from the borehole and the formation due to the transmitting of the first time-domain transient EM signal using the EM wave propagation tool, the second time-domain transient EM signal comprising frequency domain components in the range of at least 1 MHz to 1 GHz. In one or more embodiments, the receiving is performed by a receiver assembly that is part of the downhole EM wave propagation tool. The receiver assembly includes a receiver antenna and associated receiver electronics. In one or more embodiments, the receiver antenna is spaced a distance D from the transmitter antenna. In one or more embodiments, the distance D is nine inches. FIG. 5 illustrates one example of a broadband shape of voltage induced in the receiver antenna due to the transmitted pulse illustrated in FIG. 4. In the embodiment of FIGS. 4 and 5, the receiver antenna is spaced nine inches from the transmitter antenna. Measurements can be made while the downhole EM wave propagation tool is moving or, alternatively, while the tool is temporarily stopped at certain depths in order to provide measurements that are a function of depth in the borehole.

Figure 6:
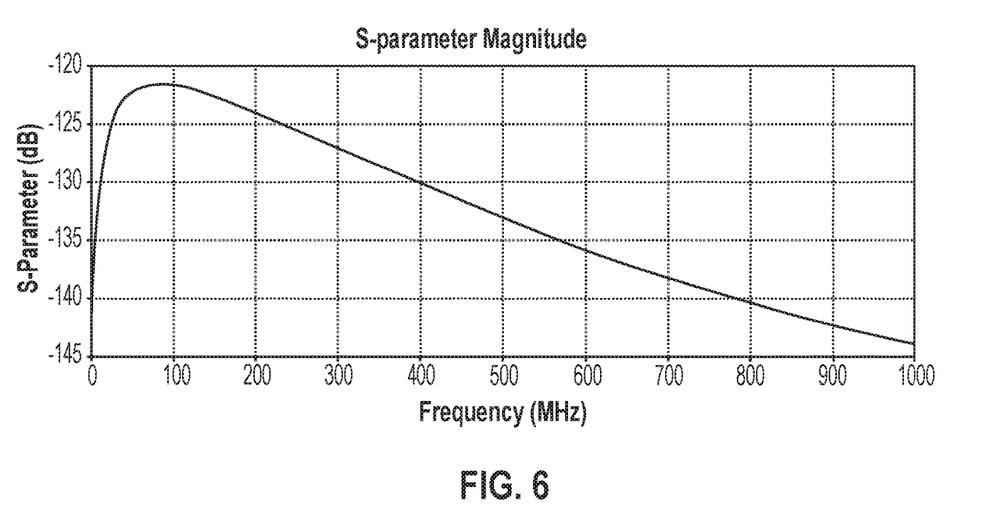
FIG. 6 depicts aspects of an S-parameter phase spectrum of the received signal.
Figure 7:
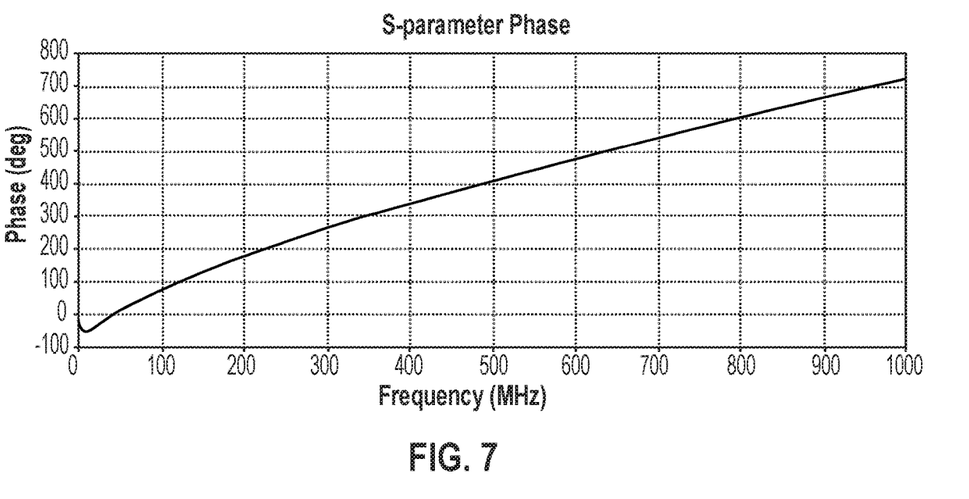
FIG. 7 is a flow chart for a method for performing a physical action related to a formation.

With reference to FIG. 3, block 34 calls for calculating, with a processor, an S-parameter attenuation as a function of frequency and an S-parameter phase shift as a function of frequency using the first time-domain transient EM signal and the second time-domain transient EM signal. In one or more embodiments, a Fourier transform is applied to the first and second signals to provide a magnitude and phase as a function of frequency for each of those signals. The S-parameter attenuation is thus a difference in the magnitudes of the transformed first and second signals. The S-parameter phase shift is thus a difference in the phases of the transformed first and second signals. FIG. 6 illustrates one example of an S-parameter amplitude spectrum of the received signal obtained through Fourier transform of the time-domain signal illustrated in FIG. 5. FIG. 7 illustrates one example of an S-parameter phase spectrum obtained through Fourier transform of the time-domain signal illustrated in FIG. 5. If the phase of the transmitted first EM signal is considered at zero, then the phase spectrum illustrated in FIG. 7 can be considered to be a phase difference spectrum. Similarly, if the amplitude of the transmitted first EM signal is arbitrarily considered to be zero, then the magnitude spectrum illustrated in FIG. 6 can be considered to be a magnitude attenuation spectrum.

With reference to FIG. 3, block 35 calls identifying, with the processor, a reference comprising a reference S-parameter attenuation as a function of frequency and a reference S-parameter phase shift as a function of frequency that are within a selected range of the calculated S-parameter attenuation as a function of frequency and the calculated S-parameter phase shift as a function of frequency, the reference representing at least one of a reference EM wave propagation tool parameter, a borehole parameter, and a formation parameter, the formation parameter comprising at least one of a resistivity value and a permittivity value of the formation as a function of frequency. By comparing (inverting) derived spectrum with pre-calculated frequency synthetic data, stored in lookup tables for example, the complex dielectric value $$\varepsilon^*(\omega) = \left(\varepsilon_r - i\frac{\sigma}{\omega\varepsilon_0}\right) = \varepsilon' - i\varepsilon'',$$

which characterizes dispersive formation, is determined. $\varepsilon_r$ is the formation relative permittivity, $\sigma$ is the formation conductivity, $\omega$ is the angular frequency, $\varepsilon_0$ is the vacuum permittivity constant. The high density spectrums illustrated in FIGS. 6 and 7 permit robust interpretation (i.e., providing a repeatable and converging solution) and have improved immunity to noise over the prior art. These spectrums also permit extrapolation of the spectrums to both high and low frequencies offering additional interpretation benefits: robust derivation of water resistivity (and salinity) at the DC limit and accurate estimation of the water saturation at high frequencies, where well established petro-physical models can be applied.

There are several ways in which references can be generated. One way is by laboratory testing using an EM wave propagation tool having a known configuration. The EM wave propagation tool can be used to test or benchmark various formation samples where each sample has known characteristics. For example, the various formation samples can have various types and combinations of fluids, various pore shapes, and various pore sizes. Another way is to generate synthetic data using known physics modeling software such as COMSOL Multiphysics® for example. The synthetic data can be generated for EM wave propagation tools having various configurations interrogating various formations having various characteristics.

With reference to FIG. 3, block 36 calls for Assigning, with the processor, the at least one of the resistivity value and the permittivity value of the reference to the formation as a function of logging depth. That is, once the closest match to one reference in a plurality of references is determined, the resistivity value and/or the complex permittivity value of the formation as a function of depth of the matched reference is assigned to the formation of interest as a function of logging depth.

Block 37 calls for performing a physical action related to the formation using the at least one of the assigned resistivity value and the assigned permittivity value as a function of logging depth.

The method 30 may also include determining a salinity value of a fluid in the formation using the associated resistivity value and the physical action may include developing the formation based on the salinity value being less than or equal to a threshold value. The term "developing" is inclusive of any actions related to producing hydrocarbons from a formation and may include drilling a new borehole or extending an existing borehole, hydraulically fracturing formation rock, placing and perforating a casing as non-limiting examples. Each of the actions is based on data obtained by the broadband EM wave propagation tool where the data meets a criterion with respect to a contemplated type of action.

The method 30 may also include calculating a relative amount of hydrocarbons in the formation with respect to another fluid as a function of depth in the formation using the associated complex permittivity of the formation as a function of frequency; and performing the physical action related to the formation using the calculated relative amount of hydrocarbons with respect to another fluid as a function of logging depth in the formation. In one or more embodiments, the physical action may include drilling a borehole into the formation having a trajectory that leads to a formation zone having at least a specified relative amount of hydrocarbons with respect to the another fluid. In one or more embodiments, physical action may include hydraulically fracturing a formation zone having at least a specified relative amount of hydrocarbons with respect to the another fluid. In one or more embodiments, the physical action may include placing a casing in the borehole based on the formation having at least a specified relative amount of hydrocarbons with respect to the another fluid over a range of depths. In one or more embodiments, the physical action may include perforating a casing lining the borehole in a formation zone having at least a specified relative amount of hydrocarbons with respect to the another fluid.

Calculating a relative amount of hydrocarbons in the formation with respect to another fluid using the complex permittivity of the formation as a function of frequency is now discussed. There are three physical phenomena contribute into dielectric permittivity: Electronic polarization (rock permittivity); Molecular polarization (molecules orientation); and Interfacial polarization due to charges at the boundaries of porous matrix filled with fluids (Maxwell-Wagner effect). In the frequency range of (1-1000) MHz all three phenomena affects complex dielectric value. Polarization vector $\vec{P}$ and displacement vector $\vec{D}$ are connected through Maxwell equation:

$$\vec{D} = \varepsilon_0 \vec{P} + \vec{E} = \varepsilon_0 \varepsilon_r \vec{E} \qquad (1)$$

where $\varepsilon_r = (1+\chi_e)$ is the relative permittivity (real number) and $\chi_e$ is the susceptibility ($\vec{P} = \varepsilon_0 \chi_e \vec{E}$). Displacement vector $\vec{D}$ and current density $\vec{j}$ are governed by the equation:

$$rot \vec{H} = \frac{d\vec{D}}{dt} + \vec{j}, \qquad (2)$$

where $\vec{j} = \sigma \vec{E}$ and rot is the "curl" operator. For harmonic regime (iω):

$$rot \vec{H} = i\omega \varepsilon_0 \left( \varepsilon_r - i\frac{\sigma}{\omega \varepsilon_0} \right) \vec{E} = i\omega \varepsilon_0 \varepsilon^* \vec{E} \qquad (3)$$

where $$\varepsilon^* = \left( \varepsilon_r - i\frac{\sigma}{\omega \varepsilon_0} \right) = \varepsilon' - i\varepsilon''$$

is called complex relative permittivity.

From $rot \vec{E} = -i\omega \vec{H}$ and (3) it can be further derived: $rot(rotE) = -i\omega \mu rot(\vec{H}) = -i\omega \mu \cdot i\omega \varepsilon_0 \varepsilon^* \vec{E} = \mu \omega^2 \varepsilon_0 \varepsilon^* \vec{E}$, which describes propagation with the wave number:

$$k = \sqrt{\mu \omega^2 \varepsilon_0 \varepsilon^*} = \omega \sqrt{\mu \varepsilon_0 (\varepsilon_r - i\sigma/\omega\varepsilon_0)}.$$

There are several dispersion model used to explain dispersive behavior of formation resistivity and dielectric constant. One dispersion model is the CRIM model. At frequencies of the order of 1 GHz and higher, the permittivity responds mainly to water volume, whereas at frequencies of 100 MHz and below the permittivity responds not only to water volume but also to interfacial polarization related to the rock texture. It can be said that at 1 GHz the response is mostly volumetric with respect to the elements and that the propagation constant of the rock, water and oil mixture can be related to its constituents as follows:

$$\sqrt{\varepsilon_{Formation}^*} = (1-\Phi)\sqrt{\varepsilon_{Matrix}} + S_W \Phi \sqrt{\varepsilon_{Water}^*} + (1-S_W)\Phi \sqrt{\varepsilon_{Oil}} \qquad (4)$$

The above expression is called the complex refractive index method, CRIM. Note that the DC (i.e., zero frequency) limit of this equation is Archie's equation with m=n=2.

The generalized CRIM model is:

$$(\varepsilon_{Formation}^*)^n = (1-\Phi)\varepsilon_{Matrix}^n + S_W \Phi (\varepsilon_{Water}^*)^n + (1-S_W) \Phi \varepsilon_{Oil}^n, \qquad (5)$$

where $\varepsilon_{Formation}^*$ and $\varepsilon_{Water}^*$ are complex numbers, while $\varepsilon_{Matrix}$ and $\varepsilon_{Oil}$ are real numbers, and n is real number. Unlike equation (4), equation (5) provides more flexibility in fitting the measurements since offers additional fitting parameter n.

In case of water, the complex relative permittivity $\varepsilon_w^*$ is described by Debye formula:

$$\varepsilon_{Water}^*(\omega) = \varepsilon_\infty + \frac{\varepsilon_s - \varepsilon_\infty}{1 + i\omega\tau} - i\frac{\sigma}{\omega\varepsilon_0}, \qquad (6)$$

where conductivity σ proportional to the water salinity.

$$\varepsilon_{Water}^*(\omega) = \varepsilon_\infty + \frac{(1 - i\omega\tau)(\varepsilon_s - \varepsilon_\infty)}{1 + (\omega\tau)^2} - i\frac{\sigma}{\omega\varepsilon_0} =$$

$$\varepsilon_\infty + \frac{(\varepsilon_s - \varepsilon_\infty)}{1 + (\omega\tau)^2} - i\left( \frac{\sigma}{\omega\varepsilon_0} + \frac{\omega\tau(\varepsilon_s - \varepsilon_\infty)}{1 + (\omega\tau)^2} \right) = \varepsilon' - i\varepsilon''$$

where:

$$\varepsilon' = \varepsilon_\infty + \frac{(\varepsilon_s - \varepsilon_\infty)}{1 + (\omega\tau)^2}, \text{ and}$$

$$\varepsilon'' = \left( \frac{\sigma}{\omega\varepsilon_0} + \frac{\omega\tau(\varepsilon_s - \varepsilon_\infty)}{1 + (\omega\tau)^2} \right).$$

Alternative mixing laws are now discussed. Unlike the CRIM, the alternative mixing laws do not exhibit explicit connection between complex dielectric value of formation and $S_w$ and $\Phi$. In general, this connection is hidden in nonlinear functions: $S_w = f_{s_w}(\alpha, \beta)$ and $\Phi = f_\Phi(\alpha, \beta)$, where $\alpha$ and $\beta$ are parameters of the following known approximations:

Cole-Cole: (7)
$$\varepsilon^*_{Formation}(\omega) = \varepsilon_\infty + \frac{(\varepsilon_s - \varepsilon_\infty)}{1 + (i\omega\tau_0)^{1-\alpha}} - i\frac{\sigma}{\omega\varepsilon_0}$$

Cole-Davidson: (8)
$$\varepsilon^*_{Formation}(\omega) = \varepsilon_\infty + \frac{(\varepsilon_s - \varepsilon_\infty)}{(1 + i\omega\tau_0)^\beta} - i\frac{\sigma}{\omega\varepsilon_0}$$

Havriliak-Negami: (9)
$$\varepsilon^*_{Formation}(\omega) = \varepsilon_\infty + \frac{(\varepsilon_s - \varepsilon_\infty)}{\{1 + (i\omega\tau_0)^{1-\alpha}\}^\beta} - i\frac{\sigma}{\omega\varepsilon_0},$$

where $\sigma$ corresponds to the water conductivity at the DC limit. Both parameter $\beta$ and $\alpha$ varies between 0 and 1. When $\alpha=0$ Havriliak-Negami coincides with Cole-Davidson. Hence, by using the CRIM model or any of the alternative mixing laws, the relative amount of hydrocarbons such as oil can be determined with respect to another fluid such as water.

Set forth below are some embodiments of the foregoing disclosure:

Embodiment 1

[?] A method for performing a physical action related to a formation, the method comprising: transmitting a first time-domain transient electromagnetic (EM) signal into a borehole penetrating the formation and into the formation using a downhole EM wave propagation tool configured to be conveyed through the borehole, the first time-domain transient EM signal comprising frequency domain components in a range of at least 1 MHz to 1 GHz; receiving a second time-domain transient EM signal from the borehole and the formation due to the transmitting of the first EM signal using the downhole EM wave propagation tool, the second time-domain transient EM signal comprising frequency domain components in the range of at least 1 MHz to 1 GHz; calculating, with a processor, an S-parameter attenuation as a function of frequency and an S-parameter phase shift as a function of frequency using the first time-domain transient EM signal and the second time-domain transient EM signal: identifying, with the processor, a reference comprising a reference S-parameter attenuation as a function of frequency and a reference S-parameter phase shift as a function of frequency that are within a selected range of the calculated S-parameter attenuation as a function of frequency and the calculated S-parameter phase shift as a function of frequency, the reference representing at least one of a reference EM wave propagation tool parameter, a borehole parameter, and a formation parameter, the formation parameter comprising at least one of a resistivity value and a permittivity value of the formation as a function of frequency: assigning, with the processor, the at least one of the resistivity value and the permittivity value of the reference to the formation as a function of logging depth: and performing the physical action related to the formation using the at least one of the assigned resistivity value and the assigned permittivity value as a function of logging depth.

Embodiment 2

The method according to any prior embodiment, wherein there are at least 10 frequency domain components in the range of at least 1 MHz to 1 GHz.

Embodiment 3

The method according to any prior embodiment, wherein calculating comprises performing a Fourier transform on the first time-domain transient EM signal and the second time-domain transient EM signal.

Embodiment 4

The method according to any prior embodiment, further comprising: calculating a relative amount of hydrocarbons in the formation with respect to another fluid as a function of depth in the formation using the associated resistivity and permittivity of the formation and a dispersion model as functions of frequency: and performing the physical action related to the formation using the calculated relative amount of hydrocarbons with respect to another fluid as a function of logging depth in the formation.

Embodiment 5

The method according to any prior embodiment, wherein the hydrocarbons comprise oil and the another fluid comprises water.

Embodiment 6

The method according to any prior embodiment, wherein the dispersion model comprises at least one of the following forms: CRIM model, Generalized CRIM model, Cole-Cole model, Cole-Davidson model, and Havriliak-Megami model.

Embodiment 7

The method according to any prior embodiment, wherein the physical action comprises drilling a borehole into the formation having a trajectory that leads to a formation zone having at least a specified relative amount of hydrocarbons with respect to the another fluid.

Embodiment 8

The method according to any prior embodiment, wherein the physical action comprises hydraulically fracturing a formation zone having at least a specified relative amount of hydrocarbons with respect to the another fluid.

Embodiment 9

The method according to any prior embodiment, wherein the physical action comprises placing a casing in the borehole based on the formation having at least a specified relative amount of hydrocarbons with respect to the another fluid over a range of depths.

Embodiment 10

The method according to any prior embodiment, wherein the physical action comprises perforating a casing lining the borehole in a formation zone having at least a specified relative amount of hydrocarbons with respect to the another fluid.

Embodiment 11

The method according to any prior embodiment, further comprising determining a salinity value of a fluid in the formation using the associated resistivity value and wherein the physical action comprises developing the formation based on the salinity value being less than or equal to a threshold value.

Embodiment 12

The method according to any prior embodiment, wherein the reference accounts for at least a portion of a parasitic effect of the first EM signal propagating through the borehole and not through the formation.

Embodiment 13

The method according to any prior embodiment, wherein the downhole EM wave propagation tool is disposed on a carrier configured to be conveyed through the borehole and the method further comprises conveying the carrier through the borehole.

Embodiment 14

An apparatus for performing a physical action related to a formation, the apparatus comprising: a downhole EM wave propagation tool configured to be conveyed through a borehole penetrating the formation and comprising a broadband transmitter assembly configured to transmit a first electromagnetic (EM) signal into the borehole and the formation, the first EM signal comprising frequency domain components in a range of at least 1 MHz to 1 GHz, the broadband transmitter assembly comprising a transmitter antenna: a broadband receiver assembly included in the downhole EM wave propagation tool and configured to receive a second time-domain transient EM signal from the borehole and the formation due to the transmitting of the first time-domain transient EM signal using the downhole EM wave propagation tool, the second time-domain transient EM signal comprising frequency domain components in the range of at least 1 MHz to 1 GHz, the broadband receiver assembly comprising a receiver antenna; a processor configure to: calculate an S-parameter attenuation as a function of frequency and an S-parameter phase shift as a function of frequency using the first EM signal and the second EM signal; identify a reference comprising a reference S-parameter attenuation as a function of frequency and a reference S-parameter phase shift as a function of frequency that are within a specified range of the calculated S-parameter attenuation as a function of frequency and the calculated S-parameter phase shift as a function of frequency, the reference representing a reference EM wave propagation tool parameter, a borehole parameter, and a formation parameter, the formation parameter comprising at least one of a resistivity value and a permittivity value of the formation as a function of frequency; assign the at least one of the resistivity value and the permittivity value of the reference to the formation as a function of logging depth; apparatus configured to perform the physical action related to the formation using the at least one of the associated resistivity value and the associated permittivity value as a function of logging depth.

Embodiment 15

The apparatus according to any prior embodiment, wherein there are at least 10 frequency domain components in the range of at least 1 MHz to 1 GHz.

Embodiment 16

The apparatus according to any prior embodiment, wherein the processor is further configured to calculate a relative amount of hydrocarbons in the formation with respect to another fluid as a function of logging depth in the formation using the associated complex permittivity of the formation as a function of frequency and the apparatus for performing the physical action related to the formation is further configured to perform the physical action using the calculated relative amount of hydrocarbons with respect to another fluid as a function of logging depth in the formation.

Embodiment 17

The apparatus according to any prior embodiment, wherein the receiver antenna is spaced a distance D from the transmitter antenna.

Embodiment 18

The apparatus according to any prior embodiment, wherein the downhole EM wave propagation tool is disposed on a carrier configured to be conveyed through the borehole.

Embodiment 19

The apparatus according to any prior embodiment, wherein the carrier comprises one of a drill string, coiled tubing, a slick line, and a wireline.

In support of the teachings herein, various analysis components may be used, including a digital and/or an analog system. For example, the surface computer processing system 17, 22, the downhole EM wave propagation tool 11, the drilling parameter controller 14, the geo-steering system 15, the downhole electronics 16, the reservoir stimulation system 28, and/or the downhole tool 21 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer-readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplar) non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" are used to distinguish different elements and are not used to denote a particular order.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for performing a physical action related to a formation, the method comprising:
    transmitting a first time-domain transient electromagnetic (EM) signal into a borehole penetrating the formation and into the formation using a downhole EM wave propagation tool configured to be conveyed through the borehole, the first time domain transient EM signal comprising frequency domain components in a range of at least 1 MHz to 1 GHz;
    receiving a second time-domain transient EM signal from the borehole and the formation due to the transmitting of the first time-domain transient EM signal using the downhole EM wave propagation tool, the second time-domain transient EM signal comprising frequency domain components in the range of at least 1 MHz to 1 GHz;
    calculating, with a processor, an S-parameter attenuation as a function of frequency and an S-parameter phase shift as another function of frequency using the first time-domain transient EM signal and the second time-domain transient EM signal;
    identifying, with the processor, a reference comprising a reference S parameter attenuation as another function of frequency and a reference S-parameter phase shift as another function of frequency that are within a selected range of the calculated S parameter attenuation and the calculated S-parameter phase shift, the reference representing at least one of a reference EM wave propagation tool parameter, a borehole parameter, and a formation parameter, the formation parameter comprising at least one of an associated resistivity value and an associated permittivity value of the formation as another function of frequency;
    assigning, with the processor, the at least one of the resistivity value and the permittivity value of the reference to the formation as a function of logging depth; and
    performing the physical action related to the formation using the at least one of the assigned resistivity value and the assigned permittivity value of the reference to the formation.

2. The method according to claim 1, wherein there are at least 10 frequency domain components in the range of at least 1 MHz to 1 GHz.

3. The method according to claim 1, wherein calculating comprises performing a Fourier transform on the first time-domain transient EM signal and the second time-domain transient EM signal.

4. The method according to claim 1, further comprising:
    calculating a relative amount of hydrocarbons in the formation with respect to another fluid as another function of depth in the formation using the at least one of the associated resistivity value and associated permittivity value of the formation and a dispersion model as functions of frequency; and
    performing the physical action related to the formation using the calculated relative amount of hydrocarbons with respect to another fluid as a function of logging depth in the formation.

5. The method according to claim 4, wherein the hydrocarbons comprise oil and the another fluid comprises water.

6. The method according to claim 4, wherein the dispersion model comprises at least one of the following forms: complex refractive index method (CRIM) model, Generalized CRIM model, Cole-Cole model, Cole-Davidson model, and Havriliak-Megami model.

7. The method according to claim 4, wherein the physical action comprises drilling the borehole into the formation having a trajectory that leads to a formation zone having at least a specified relative amount of hydrocarbons with respect to the another fluid.

8. The method according to claim 4, wherein the physical action comprises hydraulically fracturing a formation zone having at least a specified relative amount of hydrocarbons with respect to the another fluid.

9. The method according to claim 4, wherein the physical action comprises placing a casing in the borehole based on the formation having at least a specified relative amount of hydrocarbons with respect to the another fluid over a range of depths.

10. The method according to claim 8, wherein the physical action comprises perforating a casing lining the borehole in a formation zone having at least the specified relative amount of hydrocarbons with respect to the fluid.

11. The method according to claim 1, further comprising determining a salinity value of a fluid in the formation using the at least one of the associated resistivity value and wherein the physical action comprises developing the formation based on the salinity value being less than or equal to a threshold value.

12. The method according to claim 1, wherein the reference accounts for at least a portion of a parasitic effect of the first time-domain transient EM signal propagating through the borehole and not through the formation.

13. The method according to claim 11, wherein the downhole EM wave propagation tool is disposed on a carrier configured to be conveyed through the borehole and the method further comprises conveying the carrier through the borehole.

14. An apparatus for performing a physical action related to a formation, the apparatus comprising:
a downhole electromagnetic (EM) wave propagation tool configured to be conveyed through a borehole penetrating the formation and comprising a broadband transmitter assembly configured to transmit a first time-domain transient EM signal into the borehole and the formation, the first EM signal comprising frequency domain components in a range of at least 1 MHz to 1 GHz, the broadband transmitter assembly comprising a transmitter antenna;
a broadband receiver assembly included in the downhole EM wave propagation tool and configured to receive a second time-domain transient EM signal from the borehole and the formation due to the transmitting of the first time-domain transient EM signal using the downhole EM wave propagation tool, the second time-domain transient EM signal comprising frequency domain components in the range of at least 1 MHz to 1 GHz, the broadband receiver assembly comprising a receiver antenna;
a processor configure to:
calculate an S-parameter attenuation as a function of frequency and an S-parameter phase shift as another function of frequency using the first time-domain transient EM signal and the second time-domain transient EM signal;
identify a reference comprising a reference S-parameter attenuation as another function of frequency and a reference S-parameter phase shift as another function of frequency that are within a specified range of the calculated S-parameter attenuation and the calculated S-parameter phase shift, the reference representing a reference EM wave propagation tool parameter, a borehole parameter, and a formation parameter, the formation parameter comprising at least one of an associated resistivity value and an associated permittivity value of the formation as another function of frequency;
assign the at least one of the associated resistivity value and the associated permittivity value of the reference to the formation as a function of logging depth;
the apparatus configured to perform the physical action related to the formation using the at least one of the associated resistivity value and the associated permittivity value of the reference to the formation.

15. The apparatus according to claim 14, wherein there are at least 10 frequency domain components in the range of at least 1 MHz to 1 GHz.

16. The apparatus according to claim 14, wherein the processor is further configured to calculate a relative amount of hydrocarbons in the formation with respect to another fluid as another function of logging depth in the formation using an associated complex permittivity of the formation as another function of frequency and the apparatus for performing the physical action related to the formation is further configured to perform the physical action using the calculated relative amount of hydrocarbons with respect to another fluid as function of logging depth in the formation.

17. The apparatus according to claim 14, wherein the receiver antenna is spaced a distance D from the transmitter antenna.

18. The apparatus according to claim 14, wherein the downhole EM wave propagation tool is disposed on a carrier configured to be conveyed through the borehole.

19. The apparatus according to claim 18, wherein the carrier comprises one of a drill string, coiled tubing, a slick line, and a wireline.

* * * * *